July 7, 1959 W. BRAND ET AL 2,894,108
ELECTRIC HOT LIQUID HEAT CONVECTOR
Filed Dec. 18, 1956 2 Sheets-Sheet 1
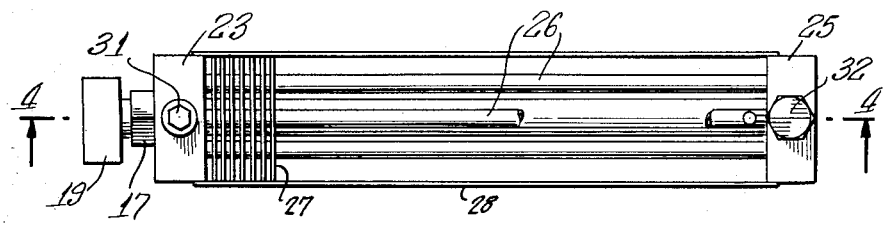
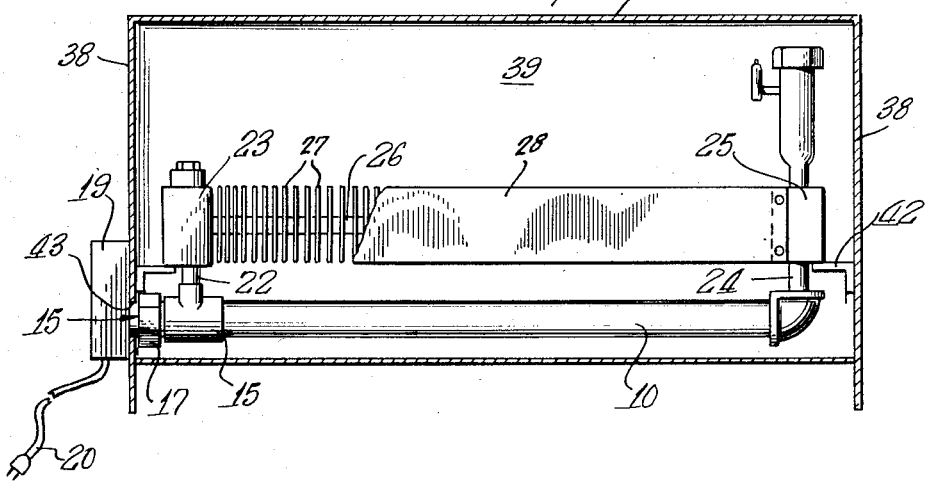
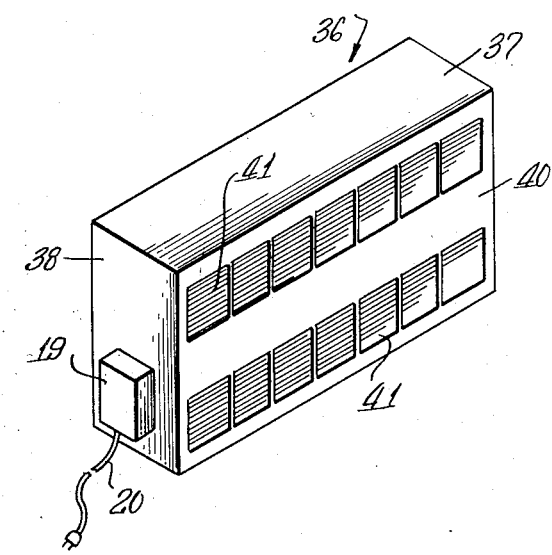
INVENTOR.
WALTER BRAND
BY IRVING HOFFMAN
ATTORNEY

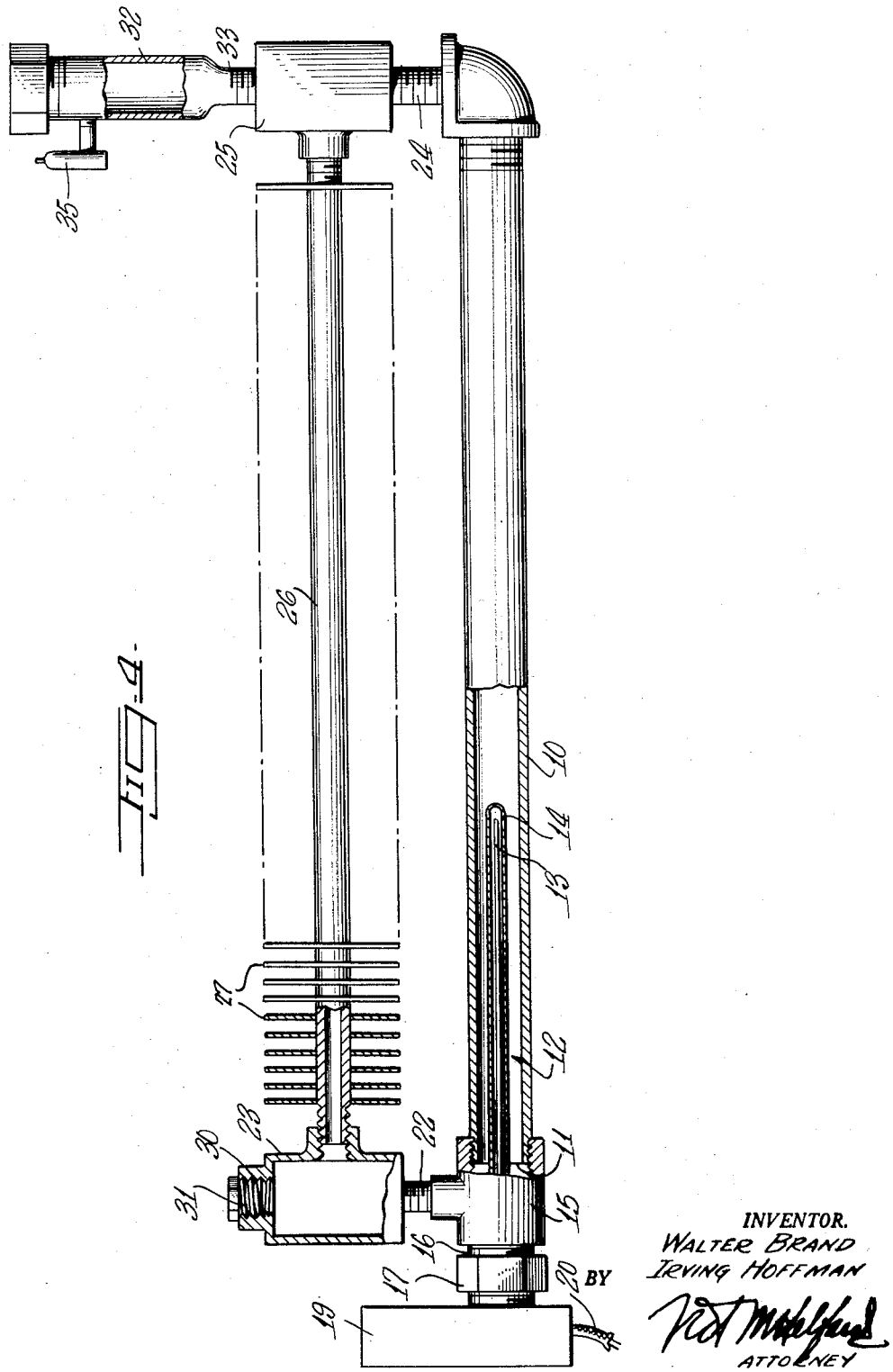

2,894,108

ELECTRIC HOT LIQUID HEAT CONVECTOR

Walter Brand, Merrick, and Irving Hoffman, New York, N.Y.

Application December 18, 1956, Serial No. 629,026

7 Claims. (Cl. 219—38)

The present invention relates to an area or room heating device or radiator, of the hot liquid circulating convector type.

It is an object of the present invention to provide a convector type heater which is self contained and which does not require any permanent connection or attachment either to a hot liquid supply source or to a heat supply source.

It is another object of the present invention to provide a hot liquid convector type heater of the character described which is portable and may be moved from area to area or shifted from place to place in the same area or room, as may be desired.

It is also an object of the present invention to provide a hot liquid, convector-type heating unit of the character described which will be as efficient and effective in its heating capacity as a conventional hot water convector heater and which will possess all of the safety and comfort characteristics of convector type hot water circulating heaters.

It is a further object of the present invention to provide a self contained convector type heater of the character described which may be provided with low freezing point characteristics, so that it may be left in inoperative condition at below freezing point temperatures without being harmed or damaged.

It is a still further object of the present invention to provide a self contained, convector type heater of the character described which is generally efficient for its purpose; which is of relatively simple construction; and which may be easily and conveniently used and economically produced.

The foregoing and other objects and advantages of the self contained convector type heater of the present invention will become more readily apparent to those skilled in the art from the embodiment thereof shown in the accompanying drawings and from the description following. It is to be understood, however, that such embodiment is shown by way of illustration only, to make the principles and practice of the invention more readily comprehensible, and without any intention of limiting the invention to the specific details therein shown.

In the drawings:

Fig. 1 is a perspective view of a cabinet enclosed heater of the present invention;

Fig. 2 is an enlarged, elevational view of the heating unit of the heater of the present invention shown in Fig. 1, with a wall of the cabinet removed;

Fig. 3 is a top plan view of the convector heating unit of the heater of the present invention; and Fig. 4 is a sectional and partly elevational view, on an enlarged scale, of the convector heating unit of the heater of the present invention.

Generally stated, the present invention resides, principally in the following main features; in the sealing of a quantity of liquid in a preferably conventional convector heating unit to be circulated therein under the influence of heat applied to the liquid; the sealing of an immersion type electric heating unit into the convector unit with its heating end immersed in the liquid within the convector unit and its other end projecting therefrom and connected preferably to a thermostat unit which is provided with a lead wire connectible to an outlet in an electric circuit; and, finally, in providing the convector unit with an individual expansion chamber for the accommodation of its liquid contents expanding under the influence of heat.

More specifically stated, the heater of the present invention comprises a convector type heating unit of generally conventional structure, consisting of a main, tubular, elongated liquid chamber or conduit, 10, of relatively wide cross section, which is open at one end, as at 11, and having an immersion type electric heating unit, generally designated as 12, inserted thereinto through its open end. Such immersion heating unit may be of any desired type, a number of which are readily available on the market, and need not, therefore, be illustrated or described in detail except to state, generally that it consists of an elongated resistance, 13, surrounded by a sealing shell, 14.

The immersion heating unit is secured in the open end 11 of the conduit 10 in sealing, leak proof relation. This may be effected in any desired manner, as by a coupling, 15, threaded on the end of the conduit 10 into which is threaded and sealed the collar, 16, fitted over the outer end portion of heating unit 12, and which is provided with the polygonal flange, 17, by which the unit may be engaged for threading into place. The outer end of the immersion heating unit 12, projecting from the fitting or coupling 15, may be directly connected to a thermostat unit, which may be of any conventional type and is more or less diagrammatically indicated at 19, to which is connected a lead line, 20, which may be removably connected, by a suitable plug, to an outlet in an electric circuit.

The conduit 10 is provided at its open end 11, as in the fitting 15, with an upwardly directed tubular extension, 22, to the upper end of which is connected a header, 23. The conduit 10 is closed at its other end where it may, likewise, be provided with an upwardly directed tubular extension, 24, which may be secured to or be integral with the conduit 10 at said other end, and which is connected to a second header, 25. A plurality of relatively narrow tubes, such as the three tubes 26, are connected to and secured between the headers 23 and 25, to complete a liquid circulating system through the convector unit. The tubes 26 may be supplied with a plurality of heat dissipating fins, 27, in the conventional manner and their ends may be protected by the metal strips, 28, along their front and rear edges, which are or may be secured to the headers 23 and 25.

One of the headers, as 23, may be provided with a tapped inlet opening, 30, wherethrough liquid may be introduced into the circulating system of the convector, and with a threaded closure plug, 31, for such inlet opening that may be held therein in leak-proof closure, An expansion chamber, to allow for the expansion of the liquid within the convector unit when heated, is also provided and mounted preferably on the other of the headers, 25. Such expansion chamber may comprise a tubular body, 32, closed at its top and having a preferably reduced lower portion, 33, which may be connected to or integral with the tube 32, by which it is set into and supported on the upper wall of the header 25. The expansion chamber 32 is provided at its upper end with a relief, air escape valve, 35, which may be of any suitable conventional type and which may be secured in place on the chamber 32 in any suitable, desired manner.

The convector unit of the present invention may be filled with any suitable liquid in amount to have the conduit 10 and tubes 26 and headers 23 and 25 completely filled and to extend slightly into the lower portion 33 of the chamber 32. While the conventional water may be used for the purpose, it may here be stated that the self contained character of the convector unit of the present invention, in which the circulating liquid is sealed in and is disassociated from any outside source, makes it practical to fill it with an anti-freeze liquid, such as glycol, or any other anti-freeze liquids, a number of which are available on the market for use in automobile radiators. It will be apparent that the use of such low freezing point liquid in the convector will make it safe to leave it unheated, without emptying, in substantially any kind of weather that is generally encountered.

The convector unit of the present invention may be mounted and supported in any desired conventional manner. It may, thus, be fixed in place in a wall niche. However, because of its self contained character it may be readily rendered portable by mounting in a cabinet, such as the one illustrated and generally designated as 36, and consists of a top wall, 37, side walls, 38, rear wall, 39, and preferably removable front wall, 40, and provided with openings, such as the lower openings, 41, at top and bottom, to permit the free circulation of air through the cabinet. The convector unit may be supported in the cabinet 36 by the bottoms of the headers 23 and 25 resting on bracket shelves, 42, secured to the side walls 38, at a midpoint thereof, with the projecting portion of the immersion heater 12 passing through a suitably positioned opening, 43, formed in the adjacent side wall 38, with the thermostat unit 19 secured to the immersion heater 12 on the exterior of the cabinet 36, for ready and convenient adjustment.

It may here be stated that, for greater mobility, the cabinet 36 may be mounted on wheels or casters. It may here also be stated that the convection unit of the present invention may, if desired, be provided with means for draining the liquid therefrom, such as a suitably connected draining tap.

This completes the description of the heating device and convector of the present invention. It will be readily apparent that such heating device, by reason of its self contained and mobile character and other advantages already pointed out, has great versatility and flexibility of use and that, because it is flameless and fumeless, may be used with a high degree of safety, convenience and economy, for the heating of a home or other structure without the need of a costly and bothersome central heating system and because of its mobility, with the use of a minimum number of such heating devices.

It will also be apparent that numerous variations and modifications in the heating devices and convector units of the present invention may be made by any one skilled in the art, in accordance with the principles of the invention hereinbefore set forth and without the exercise of any inventive ingenuity. We desire, therefore, to be protected for any and all such variations and modifications that may be made within the spirit of the present invention and the scope of the claims hereto appended.

What we claim is:

1. An electrically heated hot liquid heat convector, comprising a closed liquid circulating system, including a tubular conduit portion of relatively large cross section, said conduit portion closed at one end and having an electric immersion heater unit extending thereinto through its open end and sealing the same, a riser at each end of said conduit portion connected directly thereto, a header connected to the free end of each of said risers, and a plurality of relatively narrow tubes connected between said risers, and an expansion chamber having a safety valve connected to said liquid circulating system at an upper portion thereof, said unit having means projecting from said conduit portion whereby it may be connected in an electric circuit.

2. The heat convector of claim 1, wherein said expansion chamber comprises a tubular body closed at one end and connected by its other end to the upper end of one of said headers.

3. The heat convector of claim 1, wherein one of said headers is formed with an inlet opening and a removable closure is set into said opening and wherein said expansion chamber is connected to the other of said headers.

4. The convector of claim 1, wherein said narrow tubes have a plurality of heat dissipating fins mounted over them.

5. The convector of claim 1, wherein a thermostatic control unit is interposed and connected between said electric immersion heating unit and said means for connecting said immersion heating unit to an electric circuit outlet.

6. The heat convector of claim 1, wherein said closed liquid circulating system contains a non-aqueous liquid having a low freezing point, said liquid completely filling said system.

7. The heat convector of claim 1, including a cabinet mounting and supporting said convector, said cabinet including top, rear and side walls and a removable front wall having top and bottom air passages formed therein, said convector disposed within said cabinet with the projecting end of said immersion heating unit projecting through one of the side walls thereof and said thermostatic control unit connected thereto on the exterior of said cabinet.

References Cited in the file of this patent

UNITED STATES PATENTS

| | | |
|---|---|---|
| 1,866,221 | Pennington | July 5, 1932 |
| 1,983,437 | Carr | Dec. 4, 1934 |
| 2,736,790 | Alexander | Feb. 28, 1956 |